United States Patent [19]

Todd et al.

[11] Patent Number: 5,084,499
[45] Date of Patent: Jan. 28, 1992

[54] PHOSPHITE AS A LIGHT STABILIZER AND FUNCTIONAL ADDITIVE FOR POLYVINYL CHLORIDE

[75] Inventors: Lanny E. Todd, Nashville; William H. Meek, deceased, late of Dayton, both of Tenn., By Janet L. Meek, administratrix

[73] Assignee: Rhone-Poulenc Inc., Princeton, N.J.

[21] Appl. No.: 521,094

[22] Filed: May 9, 1990

[51] Int. Cl.$^5$ ................................................. C08K 3/32
[52] U.S. Cl. .................................. 524/414; 524/567; 524/91; 524/180
[58] Field of Search .................. 524/414, 91, 180

[56] References Cited

U.S. PATENT DOCUMENTS

| | | | |
|---|---|---|---|
| 2,507,142 | 5/1951 | Chaban | 524/567 |
| 2,579,572 | 12/1951 | Hendricks | 529/414 |
| 2,604,459 | 7/1952 | Jankowiak | 524/414 |
| 3,384,615 | 5/1968 | Agouri et al. | 524/414 |
| 3,557,051 | 1/1971 | Kometani et al. | 260/45.8 |
| 3,794,615 | 2/1974 | Beverly et al. | 260/45.7 |
| 4,221,687 | 9/1980 | Minagawa et al. | 260/23 XA |
| 4,563,496 | 1/1986 | Lindner et al. | 524/430 |
| 4,661,545 | 4/1987 | Bruis et al. | 524/147 |

FOREIGN PATENT DOCUMENTS 52-77158  6/1977  Japan.
53-115766  10/1978  Japan.

OTHER PUBLICATIONS

R. E. Lalley et al., "Stabilization of Polyvinyl Chloride", Modern Plastics Encyclopedia, 111, 112, 114, 116, 156, 157-162 (1949).
H. Verity Smith, "The Stabilization of Vinyl Resins", British Plastics, 304-307 (1952).
Chemical & Process Technology Encyclopedia, edited by Douglas M. Considine, McGraw-Hill, N.Y., 1974, pp. 1057-1058.
Journal of Vinyl Technology, Sep. 1983, vol. 5, No. 3, pp. 91-95.
American Society of Testing and Materials, Designation: G53-84, pp. 1-7.

Primary Examiner—Veronica P. Hoke
Attorney, Agent, or Firm—Morgan & Finnegan

[57] ABSTRACT

The present invention is a method employing calcium phosphite as a light stabilizer and plate-out preventative for polyvinyl chloride. A composition of calcium phosphite and polyvinyl chloride is also disclosed.

17 Claims, No Drawings

PHOSPHITE AS A LIGHT STABILIZER AND FUNCTIONAL ADDITIVE FOR POLYVINYL CHLORIDE

I. BACKGROUND OF THE INVENTION

1. Field of the Invention

The present invention relates to a method and composition employing calcium phosphite as an ultraviolet light stabilizer as well as a plate-out inhibitor for PVC.

2. Discussion of Background References

Nearly all synthetic polymers are susceptible to the degrading effects of mechanical shear, heat, ultraviolet light and oxygen. Manifestations of degradation are discoloration, loss of gloss, surface crazing, chalking and loss of desirable physical properties. Without suitable protection, even those polymers which survive processing can display useful lifetimes measured only in weeks or months. In the case of polyvinyl chloride (PVC), discoloration becomes aesthetically unacceptable during processing even though physical properties may not be seriously affected. A broad variety of stabilizers have been developed to control the degradation process so that, with proper selection, polymer lifetimes as long as 20 years may be achieved.

The polyolefins (polypropylene, polyethylenes, polystyrene, etc.) degrade by a free radical oxidative process initiated by the heat and mechanical shear of processing and by ultraviolet (UV) light. Hindered phenolic antioxidants and organophosphites provide adequate protection during processing and indoor applications. In outdoor applications, however, these additives are consumed too rapidly to provide adequate protection. Hydroxybenzoate esters and hindered amines, which function as catalytic free radical terminators, provide good outdoor protection particularly in combination with phosphites and certain other co-additives.

The degradation of polyvinyl chloride (PVC) is more complicated. The heat and shear of processing initiates an autocatalytic dehydrochlorination which leads to highly colored, conjugated unsaturation. This causes the color of the plastic to change from white to yellow through tan, brown, reddish-brown, and finally black. This discoloration precedes any measurable change in physical properties. Later, free radical oxidation causes loss of gloss, chalking and deterioration of physical properties. The degradation of PVC is further described by Summers et al,, *The Chemical Mechanisms of Outdoor Weathering in Polyvinyl Chloride*, J. Vinyl Tech., Vol. 5, No. 3, Sept. 1983.

Functional PVC products are compounded systems; virgin resin is never used alone. There are two general classes of polyvinyl chloride; rigid and flexible.

Rigid PVC contains, in addition to the resin, a heat stabilizer, a lubricant, usually a processing aid, usually an impact modifier, usually a light (UV) stabilizer, and various fillers and pigments. All products for exterior use (house siding, window components, gutters, pipe, etc.) must contain a UV stabilizer. A heat stabilizer solves a different problem that does a light stabilizer. A heat stabilizer is intended to alleviate problems caused by heat during manufacture or, for example, by temperatures caused by exposure to sunlight. A light stabilizer is intended to alleviate problems caused by long term exposure to the ultraviolet radiation in sunlight. In rigid polyvinyl chloride, tin mercaptides are superior heat stabilizers but contribute little to light stability. Processing aides such as lubricants, to reduce melt viscosity, and acrylics, to control flow of polymer melt, also contribute to stability. In outdoor applications, such as house siding and gutters, titanium dioxide effectively controls light-initiated degradation whereas the polyolefin light stabilizers are relatively ineffective. Substituted benzotrizoles are also occasionally used as UV stabilizers in PVC. However, it would be desirable to find alternatives for controlling light-initiated degradation.

Flexible PVC contains greater than about 25% by weight of a plasticizer in addition to the other additives mentioned above. It is used in automobile upholstery, wall covering, jacketing for electrical wire and cable etc. In flexible polyvinyl chloride, fatty acid soaps of cadmium, barium, zinc and calcium in combination with phosphites, will provide good protection against discoloration. Flexible PVC usually does not contain a UV stabilizer, although certain products (such as automobile upholstery) do.

*Chemical and Process Technology Encyclopedia*, pp. 1057-58 (D. M. Constantine ed. 1974) (McGraw-Hill) describes a variety of PVC stabilizers. The stabilizers includes lead compounds, barium and cadmium stabilizer systems, barium compounds, cadmium compounds, zinc compounds, calcium compounds, organic phosphites, polyhydric alcohols, nitrogenous compounds, epoxy plasticizers and organotin compounds.

U.S. Pat. No. 4,221,687 to Minagawa, et al. discloses the use of a calcium salt plus a 1,3-diketone compound as a heat stabilizer, for vinyl chloride polymer compositions to prevent yellowing during fabrication. The calcium salts $CaO.CaHPO_3$ and $3Ca(OH)_2.CaHPO_3$ are disclosed in a list of metal basic inorganic acid salts.

U.S. Pat. No. 2,579,572 to Hendricks discloses a vinyl chloride resin composition stable against the action of light and containing from 0.5 to 10 parts by weight of sodium phosphite or potassium phosphite. In addition to the vinyl resin and phosphite salt components, the composition may also contain plasticizers, coloring and modifying agents and, if desired, other stabilizing agents. In particular, Hendricks discloses forming a sodium or potassium phosphite intermediate product containing a lubricant soap such as, for instance, barium ricinoleate.

U.S. Pat. No. 2,604,459 to Jankowiak discloses stabilization of polymers comprising vinyl or vinylidene chlorides against heat and light. It also discloses the amelioration of the effects of inorganic impurities, such as iron, which make the polymer more susceptible to thermal decomposition. The disclosed process involves contacting the polymer with an acidic (adjusted to acidic pH with mineral acid) solution of alkali metal phosphates, polyphosphates or phosphites and drying the additives onto the polymer.

However, none of the above references disclose the use of calcium phosphite as a light stabilizer.

Another problem in polyvinyl chloride processing is the existence of residue from polyvinyl chloride extruding and molding. This residue contaminates subsequent polyvinyl chloride manufacture and is known in the art as plate out. None of the above references relate to this problem nor teach a method of preventing the same.

Furthermore, there is an ample supply of calcium phosphite-containing material provided as a by-product of sodium hypophosphite manufacture. It would be desirable to find a valuable use for this material.

II. SUMMARY OF THE INVENTION

It is an object of the present invention to provide a method for using calcium phosphite as a light stabilizer and plate out preventative for polyvinyl chloride.

It is another object of the present invention to provide a stabilized polyvinyl chloride composition containing calcium phosphite.

The present invention provides a method for using calcium phosphite to stabilize polyvinyl chloride against the action of ultraviolet light. The method includes adding from about 1 to about 20 weight parts of calcium phosphite-containing material to 100 parts of polyvinyl chloride in the absence of any diketone compounds. The calcium phosphite-containing material includes at least about 50 weight percent calcium phosphite ($CaHPO_3$). The calcium phosphite-containing material may further include as much as 25 weight percent calcium hydroxide (on a hydrated basis). Preferably from about 1 to about 10 weight parts of the calcium phosphite-containing material are added to 100 parts of polyvinyl chloride (i.e. at least 0.5 to 5 parts ($CaHPO_3$) for 1 to 10 parts, respectively, of the calcium phosphite-containing material).

The calcium phosphite also has the advantage of being a plate-out preventative for polyvinyl chloride. Plate-out is residue from milling and extruding polyvinyl chloride. It is desirable to avoid plate-out to prevent the residue from one batch of polyvinyl chloride from contaminating a subsequent batch of polyvinyl chloride.

The present invention is also a polyvinyl chloride composition which includes about 1 to about 20 weight parts, preferably about 1 to about 10 parts, of the calcium phosphite-containing material for 100 parts of polyvinyl chloride.

III. DETAILED DESCRIPTION OF THE INVENTION

The present invention provides a composition and method for employing calcium phosphite as an additive to polyvinyl chloride. The additive has dual advantages: it stabilizes the polyvinyl chloride against ultraviolet light and is a plate-out preventative. More particularly, the present invention is employed with rigid polyvinyl chloride. As a light stabilizer, the present invention prevents loss of gloss and prevents polyvinyl chloride from becoming chalky. Chalkiness indicates polymer breakdown.

Either reagent grade calcium phosphite or calcium phosphite-containing material comprising as little as about 50 weight % calcium phosphite is suitable for the present invention. A typical calcium phosphite-containing material includes up to about 25 weight % calcium hydroxide on a basis of total weight of the material (including water), or up to about 30 weight % calcium hydroxide on a water free basis. Preferably the calcium phosphite is provided from a readily available source. An example of such a source is calcium phosphite-containing material produced as a by-product of the manufacture of sodium hypophosphite. A typical composition for such a by-product is 80 weight percent $CaHPO_3 \cdot 1\frac{1}{2}H_2O$ and about 20 weight percent $Ca(OH)_2$. About 1 to about 20 weight parts, preferably about 1 to about 10 weight parts, of the calcium phosphite-containing material is added to 100 parts of polyvinyl chloride in the absence of any diketone compound. Thus, the 1,3-diketone compounds of U.S. Pat. No. 4,221,687 to Minagawa are not employed. The calcium phosphite-containing material is mixed with polyvinyl chloride by standard compounding procedures. A typical compounding procedure would employ 2 roll mills.

In addition to the benefits of the calcium phosphite-containing material as a light stabilizer additive, the material is also a plate-out preventative. Plate-out occurs when polyvinyl chloride is mixed with additives such as lubricants, pigments, or other additives. The plate-out is the residue from milling and extruding the polyvinyl chloride with its additives. Such residue would then contaminate subsequent production of polyvinyl chloride product. Thus, the present invention avoids the need to employ conventional plate-out preventatives such as calcium carbonate.

The present invention also relates to an ultraviolet light stabilized polyvinyl chloride composition comprising about 1 to about 20 weight parts of the calcium phosphite-containing material which is described above. That is, suitable calcium phosphite-containing material is reagent grade or any of the less pure versions described above. No diketones are present in the composition. Preferably, the composition includes about 1 to about 10 weight parts of the calcium phosphite-containing material per 100 parts of polyvinyl chloride.

The present invention has the advantage that it can employ calcium phosphite produced as a by-product of sodium hypophosphite manufacture to stabilize polyvinyl chloride against ultraviolet light. Although other inorganic- and organo-phosphites are currently employed in these applications, they are costly. Dibasic lead phosphite ($PbHPO_3 \cdot 2PbO$) is an inorganic phosphite and is one of the original stabilizers for polyvinyl chloride. It is still used, mostly in jacketing for electrical cable or for outdoor use. However, because of lead migration from the resin, dibasic lead phosphite can not be used in potable water- or food-contact applications. Dibasic lead phosphite is currently the only nonproprietary inorganic phosphite present in commerce and is advantageous where discoloration is to be avoided. Numerous organo phosphites, with tris(nonylphenyl) phosphite probably the largest selling product, are used for polyvinyl chloride and polyolefin stabilization. However, the organo phosphites contribute some discoloration to the polymer.

In addition to providing a valuable use for calcium phosphite, such as that produced as a by-product of sodium hypophosphite manufacture, use of calcium phosphite in the present invention, has the following advantages:

small particle size as precipitated, averaging 9.5 microns;
extremely low solubility in water;
little or no mammalian toxicity; and
fungicidal properties.

The present invention is further disclosed by the following non-limiting examples.

The calcium phosphite ($CaHPO_3$) used in the examples was a typical byproduct of sodium hypophosphite manufacture which had been washed with deionized water to remove all traces of sodium hypophosphite; dried; deagglomerated; and screened through 325 mesh. Its composition is provided by Table I.

TABLE I

Physical appearances: off-white powder
Median particle size as determined via a laser-based particle size analyzer: 9.5 microns
Chemical analysis:

TABLE I-continued

| | |
|---|---|
| % $P_2O_5$ | 39.74 |
| % $CaHPO_3 \cdot 1\frac{1}{2}H_2O$ (calculated from % $P_2O_5$) | 82.36 |
| % CaO | 47.06 |
| % $Ca(OH)_2$ (by difference) | 20.73 |
| % acid insoluble | 0.28 |
| pH of a 1% slurry | 12.1 |

EXAMPLES 1-6

Formulations of Examples 1-6 are described in Table II. Each formulation was blended in a laboratory mixer at 175° F. (79° C.) and then fused on a 2-roll mill at 365° F. (185° C.) for 5 minutes. The cool slabs of flexible PVC (Examples 1, 2 and 3) were each cut into approximately ½ inch squares (1.27 cm). They were then tested for heat stability by placing eight squares of each formulation of Examples 1, 2 and 3 in an oven at 365° F. (185° C.). Test duration was 2 hours with one square (chip) being withdrawn for each formulation at 15, 30, 45, 60, 75, 90, 105 and 120 minutes elapsed in the oven and then mounted on a display chart for visual comparison. Instrumental color measurement can be made but the industry accepts visual comparisons except where subtle differences arise.

Examples 4-6 were conducted to determine calcium phosphite's efficacy as a UV stabilizer in PVC and, at the same time, compare its performance to that of titanium dioxide. Titanium dioxide is probably the most often used light stabilizer in rigid PVC for outdoor applications. The cool slabs of rigid PVC (Examples 4, 5 and 6) were reduced in particle size, for compression molding, by grinding. The particles were then compression molded to make two 5×1×⅛ inch (12.7/2.54/0.3175 cm) plaques, for light exposure. The six plaques (two for each formulation of Examples 4, 5 and 6) were placed in an accelerated weathering tester (per ASTM G 53-84), and exposed continuously to alternating cycles of ultraviolet light (8 hours at 50° C.) and condensing vapor (4 hours at 42° C.). The test duration was approximately 6 weeks (actually 39.7 days). One plaque from each of the three formulations was then removed and examined for discoloration, chalking and loss of gloss. Table III lists the results observed from this examination.

The remaining placques of Examples 4, 5 and 6 were kept in the tester until a total exposure of 12 weeks was achieved. Then the plaques were removed for examination. The results observed by this examination are listed by Table IV. Color changes were measurede instrumentally while gloss and chalking were observed visually.

TABLE II

| PVC Formulations |
|---|
| Example 1 (comparative Example) |
| 100 parts flexible PVC |
| 55.00 parts DOP (1) |
| 5.00 parts Epoxy (2) |
| 1.50 parts Ba/Cd powder (3) |
| 1.50 parts Diphenyldecyl Phosphite (4) |
| 0.25 parts Ca stearate |
| 2.00 parts Ca carbonate |
| Example 2 (Invention) |
| 100 parts flexible PVC |
| 55.00 parts DOP (1) |
| 5.00 parts Epoxy (2) |
| 1.50 parts Ba/Cd powder (3) |
| 1.50 parts $CaHPO_3$ |
| 0.25 parts Ca stearate |
| Example 3 (Invention) |
| 100 parts flexible PVC |
| 55.00 parts DOP (1) |
| 5.00 parts Epoxy (2) |
| 3.00 parts $CaHPO_3$ |
| 0.25 parts Ca stearate |
| Example 4 (comparative example) |
| 100 parts rigid PVC |
| 2.50 parts Mark 1900 (5) |
| 10.00 parts $TiO_2$ |
| 3.00 parts K-120-N (6) |
| 0.75 parts Loxiol G-15 (7) |
| 1.00 parts Loxiol G-40 (8) |
| Example 5 (comparative example) |
| 100 parts rigid PVC |
| 2.50 parts Mark 1900 (5) |
| 5.00 parts $TiO_2$ |
| 3.00 parts K-120-N (6) |
| 0.75 parts Loxiol G-15 (7) |
| 1.00 parts Loxiol G-40 (8) |
| Example 6 (Invention) |
| 100 parts rigid PVC |
| 2.50 parts Mark 1900 (5) |
| 5.00 parts $TiO_2$ |
| 3.00 parts K-120-N (6) |
| 0.75 parts Loxiol G-15 (7) |
| 1.00 parts Loxiol G-40 (8) |
| 3.00 parts $CaHPO_3$ |

Notes
(1) Dioctylphthalate plasticizer, C. P. Hall Co.
(2) Epoxidized soybean oil plasticizer - Ferro Chemical Co.
(3) Heat stabilizer - Argus Chemical Co.
(4) Diphenyldecyl phosphite - Borg Warner
(5) Tin mercaptide stabilizer - Argus Chemical Co.
(6) Acrylic processing aid - Rohm & Haas
(7) Internal lubricant - Henkel Corp.
(8) Internal/external lubricant - Henkel Corp.

Mark 1900 is a typical alkyl tin mercaptide heat stabilizer manufactured by Argus, a subsidiary of Witco Chemical Co. Tin mercaptides are the most efficient heat stabilizers for both processing and long term end use. The heat absorbed by vinyl house siding, for example, can cause degradation due to heat distortion. This results in warping or sagging. Thus, the tin mercaptides are preferred in such applications even though light stability is poor and they necessitate high levels of $TiO_2$.

The Loxiols are lubricants manufactures by Henkel Corp. G-40, a fatty alcohol ester, is a combination internal/external lubricant. G-715 (now known as G-15 in the U.S.) contains hydrogenated castor oil and is an internal lubricant. External lubricants prevent adhesion of the polymer melt to processing equipment. The internal lubricants reduce melt viscosity thus lowering energy demands and increasing productivity.

K-120-N is an acrylic polymer produced by Rohm & Haas. Its function is to cause a uniform flow of polymer melt through an extrusion die or into an injection mold. In its absence, molded goods or extruded profiles would have surface irregularities or blemishes.

Chemical and/or performance equivalents of Mark 1900, the Loxiols and K-120-N are manufactured by a number of companies.

DISCUSSION OF EXAMPLES 1-3

Example 2 is typical of formulations containing no diphenyldecyl phosphite. Example 3 is typical of formulations containing neither diphenyldecyl phosphite nor Ba/Cd heat stabilizer. Visually comparing color, $CaHPO_3$ displays no activity as either a phosphite or primary heat stabilizer. Flexible PVC often does not contain a UV stabilizer, although certain products, such as garden hose and automobile upholstery, do contain a UV stabilizer. For this reason calcium phosphite was not tested as a UV (light) stabilizer in flexible PVC. However, nothing indicates that calcium phosphite cannot be equally effective, as a light stabilizer for flexible PVC, as Examples 4-6 show it to be for rigid PVC.

DISCUSSION OF EXAMPLES 4-6

For rigid PVC, Table III demonstrates the ability of $CaHPO_3$ to delay the onset of discoloration, loss of gloss and chalking. After 6 weeks, Example 6 displayed the least discoloration with no loss of gloss or chalking. In the degradation of PVC by ultraviolet light, the first overt change is discoloration, and this occurs far in advance of any change in mechanical properties. Titanium dioxide is commonly used to mask the inevitable color change. Examples 4-6 demonstrate that calcium phosphite is a suitable replacement for $TiO_2$ in this use.

Table IV demonstrates that after 12 weeks, chalking prevailed in Example 4 and Example 5. This chalking dissipated color so that comparison at that stage had no meaning. It is estimated that Example 6, after 12 weeks had reached the degree of degradation of Example 5 at 5 weeks and Example 4 at 7-8 weeks. This suggests that 3 parts of $CaHPO_3$ per 100 parts PVC is superior to 5 parts of $TiO_2$ per 100 parts PVC.

TABLE III

LIGHT STABILITY OF RIGID PVC AFTER SIX WEEKS

| | Color After Exposure | DE* | Loss of Gloss | Chalk |
|---|---|---|---|---|
| Example 4 | Tan | 9.99 | slight | none |
| Example 5 | Light Brown | 11.03 | slight | none |
| Example 6 (Invention) | Faint Yellowing | 6.53 | none | none |

*Color change instrumentally compared with unexposed sample.

TABLE IV

LIGHT STABILITY OF RIGID PVC AFTER TWELVE WEEKS

| | DE* | Loss of Gloss | Chalk |
|---|---|---|---|
| Example 4 | 5.35 | complete | moderate |
| Example 5 | 6.29 | complete | slight |
| Example 6 (Invention) | 11.97 | moderate | none |

*Color change instrumentally compared with unexposed sample.

EXAMPLES OF CALCIUM PHOSPHITE AS A PLATE-OUT PREVENTATIVE

Conventional extenders and molders processing PVC experience a troublesome residue built-up on processing equipment referred to by those in the industry as "plate out". During the course of processing flexible PVC in Examples 2 and 3, it was observed that $CaHPO_3$ prevented the troublesome "plate-out" common in such systems. This observation was confirmed in the rigid systems of Examples 4, 5 and 6. Molders and extruders will experience plate-out problems especially in applications where inexpensive stabilizers or colorants are used. Consequently calcium phosphite has ancillary value as a plate-out preventative (plate-out stabilizer). Examples 7-18 will test the effectiveness of calcium phosphite as a plate out preventative.

PROCEDURE FOR TESTING

Prepare the following standard test compound for Examples 7-18:

| | |
|---|---|
| PVC Resin | 100.00 parts |
| DOP (1) | 45.00 parts |
| Epoxy (2) | 5.00 parts |
| Stearic Acid | .25 parts |
| | 150.25 parts |

Notes:
(1) Dioctylphthalate plasticizer by C. P. Hall Co.
(2) Epoxidized soybean oil plasticizer by Ferro Chemical Co.

Mix the above batch in the lab mixer no hotter than 175° F. (79° C.) to prevent degradation because no stabilizer is contained at this point. Weigh the following for the next step, which requires milling on a 2-roll mill:

| | |
|---|---|
| Standard test compound | 100.00 parts |
| RED 2B pigment | 2.00 parts |
| Stabilizer to be evaluated | Specified in Table V for Examples 7-10 and Table VI for Examples 11-18. |

Allow to mill for 3-5 minutes at 365° F. (185° C.) uninterrupted and then remove the test slab. Immediately follow each test with 100 grams of an unpigmented natural compound made with the following recipe:

| | |
|---|---|
| PVC Resin | 100.00 parts |
| DOP | 45.00 parts |
| Epoxy | 5.00 parts |
| Lead Stabilizer | 2.00 parts |
| Calcium Carbonate | 30.00 parts |
| Stearic Acid | .25 parts |
| | 182.25 parts |

The test slab with the RED 2B will leave a film or residue on the mill rolls if the stabilizer is inferior in the area of plate-out. By following the test slab with a natural compound which "picks up" the red residue left behind by the test slab, one can visually compare which stabilizers perform best in a particular application. Also, additives which prevent or retard plate-out, can be evaluated by using this test procedure.

EXAMPLES 7-10

Several formulations containing a representative barium-cadmium-zinc stabilizer were prepared by the procedure outlined previously and are shown in Table V. All units in Table V are in weight parts.

TABLE V

PLATE-OUT IN BARIUM-CADMIUM-ZINC SYSTEM

| Example | 7 (comparative example) | 8 | 9 | 10 |
|---|---|---|---|---|
| PVC | 100.00 | 100.00 | 100.00 | 100.00 |
| MARK 706 (1) | 2.00 | 2.00 | 2.00 | 2.00 |
| RED 2B (2) | 2.00 | 2.00 | 2.00 | 2.00 |
| Calcium Phosphite | — | 3.00 | 2.00 | 1.00 |
| Color of Subsequent Batch | Trace Red | Ivory | Slight Red Trace | Ivory Slight Discoloration |

Notes:
(1) Mark 706 is a liquid barium-cadmium-zinc stabilizer manufactured by the Argus Chemical subsidiary of Witco Chemical Corporation.
(2) Red 2B is a conventional pigment.

DISCUSSION OF RESULTS OF EXAMPLES 7–10

As indicated by the above-listed results for "Color of Subsequent Batch," only moderate plate-out is exhibited by the stabilizer, Mark 706. However, any plate-out can be objectionable to those producers of products which have long production runs such as garden hose, furniture strapping and automotive trims. Example 8 shows that 3 parts of CaHPO₃ totally eliminated discoloration of the subsequently processed material. It is encouraging to see that even a small amount of the calcium phosphite material eliminates this.

EXAMPLES 11–18

Table VI lists samples tested which employ another commonly-utilized stabilizer system. The system is a synergistic combination of a barium-cadmium stabilizer along with an organophosphite. The organophosphite class of compounds act as nonstaining antioxidants and may chelate the metal salts formed during processing. This greatly enhances the performance of the Ba/Cd stabilizer. Additionally, in the examples the efficacy of calcium phosphite as a plate-out preventative is compared to that of other common materials used to prevent this problem.

The common materials used to reduce or prevent "plate out") are:
1) Lubricants, such as hydrogenated fatty acids of which Loxiol G-21, manufactured by Henkel, is an example;
2) Calcium carbonate which functions as a "scrubber";
3) Acrylic processing acids such as Acryloid K-175, manufactured by the Rohm and Haas Company.

These are illustrated in Examples 16, 17 and 18, respectively. As discussed above, there are two types of stabilizers typically employed with PVC: one for heat and one for UV. The barium-cadmium-organo phosphite stabilizers cited in the Examples 11–18 are heat stabilizers. Examples 11, 16, 17, and 18 are comparative examples. The units of Table VI are weight parts.

parts CaHPO₃ per 100 parts PVC resin. Color pickup increased with decreased loading of CaHPO₃. None of three commonly-used preventatives provided the plate-out prevention that the calcium phosphite offered. A loading of only 4 parts CaHPO₃ per 100 parts PVC resin was superior to the three commonly-used preventatives at recommended loadings: CaCO₃ at 5 phr (parts per hundred parts resin), Loxiol G-21 at 0.5 phr, and Acryloid K-175 at 1.50 phr. Also, note Example 14 and Example 17. At the same level of 5 phr, calcium phosphite is a better plate out preventative than calcium carbonate. While not limiting the invention to the following theory, this comparison would indicate that calcium phosphite is more than just a "scrubber" and may actually offer some chemical reason for plate-out prevention.

Thus, it appears that even a small amount of calcium phosphite offers better protection against plate-out than the more conventional, and at times more expensive, additives commonly used in the industry.

While specific embodiments of the method and composition aspects of the invention have been shown and described, it should be apparent that many modifications can be made thereto without departing from the spirit and scope of the invention. Accordingly, the invention is not limited by the foregoing description, but is only limited by the scope of the claims appended hereto.

We claim:

1. A method for stabilizing polyvinyl chloride against ultraviolet light and preventing plate-out from polyvinyl chloride, consisting essentially of the steps of:
   adding about 1 to about 20 weight parts of a calcium phosphite-containing material which comprises at least about 50 weight percent CaHPO₃, in the absence of any diketone compound, to 100 parts of said polyvinyl chloride; and
   optionally adding at least one member of the group consisting of TiO₂, tin mercaptide, barium/cadmium powder, plasticizer, impact modifier, substi-

TABLE VI

| | PLATE OUT IN BARIUM CADMIUM ORGANOPHOSPHITE STABILIZER SYSTEM | | | | | | | |
|---|---|---|---|---|---|---|---|---|
| Example | 11 | 12 | 13 | 14 | 15 | 16 | 17 | 18 |
| PVC | 100.00 | 100.00 | 100.00 | 100.00 | 100.00 | 100.00 | 100.00 | 100.00 |
| PLX-806 | 2.00 | 2.00 | 2.00 | 2.00 | 2.00 | 2.00 | 2.00 | 2.00 |
| VANSTAY ® SH | .75 | .75 | .75 | .75 | .75 | .75 | .75 | .75 |
| RED 2B | 2.00 | 2.00 | 2.00 | 2.00 | 2.00 | 2.00 | 2.00 | 2.00 |
| Calcium Phosphite | — | 3.00 | 4.00 | 5.00 | 10.00 | — | — | — |
| Loxiol G-21 | — | — | — | — | — | .50 | — | — |
| Calcium Carbonate | — | — | — | — | — | — | 5.00 | — |
| Acryloid K-175 | — | — | — | — | — | — | — | 1.50 |
| Color Value | 7 | 4 | 3 | 2 | 1 | 5 | 4 | 6 |

Notes:
PLX-806 is a barium/cadmium type stabilizer made by R. T. Vanderbilt Co.
VANSTAY ® SH is an organic chelating agent made by R. T. Vanderbilt Co. It is a mixture of alkyl aryl phosphite compounds.
RED 2B is a standard pigment.
Loxiol ® G-21 is a hydrogenated fatty acid made by Henkel.
Acryloid D-175 is an acrylic-based polymer which functions as both lubricant and processing aid in processing vinyl chloride polymers. It is made by Rohm and Haas.

DISCUSSION OF RESULTS OF EXAMPLES 11–18

By visual comparison, seven intensities of color, ranging from very light pink to dark pink were identified for the specimens of natural unpigmented compound. These colors were assigned values from 1 (very light pink) to 7 (dark pink).

From the color values listed in Table VI, it can be seen that the lowest color pickup was achieved at 10 tuted benzotriazole, filler, pigment, lubricant, polymeric acrylic processing aid, alkyl aryl phosphite, stearic acid and barium-cadmium-zinc liquid.

2. The method of claim 1, wherein about 1 to about 10 weight parts of said calcium phosphite-containing material are added per said 100 parts of said polyvinyl chloride.

3. The method of claim 2, wherein said calcium phosphite-containing material further comprises up to about 25 weight percent calcium hydroxide on a total weight basis.

4. The method of claim 2, wherein said calcium phosphite containing material further comprises up to about 30 weight percent calcium hydroxide on a water-free basis.

5. The method of claim 3, wherein said calcium phosphite-containing material comprises about 80 weight percent CaHPO$_3$.1½H$_2$O and about 20 weight percent Ca(OH)$_2$.

6. The method of claim 5, further comprising the step of recovering said calcium phosphite-containing material as a by-product from sodium hypophosphite manufacture prior to said adding step.

7. The method of claim 1, wherein said polyvinyl chloride is rigid polyvinyl chloride.

8. A method for stabilizing said polyvinyl chloride against ultraviolet light and preventing plate-out from rigid polyvinyl chloride, consisting essentially of the steps of:
  adding about 1 to about 10 weight parts of a calcium phosphite-containing material which comprises about 80 weight percent CaHPO$_3$.1½H$_2$O and about 20 weight percent calcium hydroxide, in the absence of any diketone compound, to 100 parts of said rigid polyvinyl chloride; and
  optionally adding at least one member of the group consisting of TiO$_2$, tin mercaptide, barium/cadmium powder, plasticizer, pigment, impact modifier, substituted benzotriazole, filler, lubricant, polymeric acrylic processing aid, alkyl aryl phosphite, stearic acid and barium-cadmium-zinc liquid.

9. An ultraviolet light stabilized, and plate-out stabilized, polyvinyl chloride composition consisting essentially of:
  about 1 to about 20 weight parts of calcium phosphite-containing material which comprises at least about 50 weight percent CaHPO$_3$;
  100 weight parts of polyvinyl chloride in the absence of any diketone compound; and
  optionally at least one member of the group consisting of TiO$_2$, tin mercaptide, barium/cadmium powder, plasticizer, pigment, impact modifier, substituted benzotriazole, filler, lubricant, polymeric acrylic processing aid, alkyl aryl phosphite, stearic acid and barium-cadmium-zinc liquid.

10. The composition of claim 9, comprising about 1 to about 10 weight parts of said calcium phosphite-containing material per said 100 parts of said polyvinyl chloride.

11. The composition of claim 10, wherein said calcium phosphite-containing material further comprises up to about 25 weight percent calcium hydroxide on a total weight basis.

12. The composition of claim 10, wherein said calcium phosphite-containing material further comprises up to about 30 weight percent calcium hydroxide on a water free basis.

13. The composition of claim 11, wherein said calcium phosphite-containing material comprises about 80 weight percent CaHPO$_3$.1½H$_2$O and about 20 weight percent Ca(OH)$_2$.

14. The composition of claim 9, wherein said polyvinyl chloride is rigid polyvinyl chloride.

15. An ultraviolet stabilized, and plate-out stabilized, rigid polyvinyl chloride composition consisting essentially of:
  about 1 to about 10 weight parts of calcium phosphite-containing material which comprises about 80 weight percent CaHPO$_3$.1½H$_2$O and about 20 weight percent calcium hydroxide;
  100 weight parts of said rigid polyvinyl chloride in the absence of any diketone compound; and
  optionally at least one member of the group consisting of TiO$_2$, tin mercaptide, barium/cadmium powder, plasticizer, pigment, impact modifier, substituted benzotriazole, filler, lubricant, polymeric acrylic processing aid, alkyl aryl phosphite, stearic acid and barium-cadmium-zinc liquid.

16. The composition of claim 13, wherein said calcium phosphite-containing material has a particle size sufficiently small to pass through 325 mesh.

17. The composition of claim 16, wherein said material has an average particle size of about 9.5 microns.

* * * * *